(12) United States Patent
Thrash

(10) Patent No.: US 11,330,769 B2
(45) Date of Patent: *May 17, 2022

(54) DELAYED-ACTIVATION, HYDRATION MAINTENANCE APPARATUS AND METHOD

(71) Applicant: AQUASMART ENTERPRISES, LLC, Lubbock, TX (US)

(72) Inventor: Tommy K. Thrash, Lubbock, TX (US)

(73) Assignee: Aquasmart Enterprises, LLC

( * ) Notice: Subject to any disclaimer, the term of this patent is extended or adjusted under 35 U.S.C. 154(b) by 683 days.

This patent is subject to a terminal disclaimer.

(21) Appl. No.: 15/918,859

(22) Filed: Mar. 12, 2018

(65) Prior Publication Data

US 2018/0295794 A1 Oct. 18, 2018

Related U.S. Application Data

(63) Continuation of application No. 14/293,555, filed on Jun. 2, 2014, now abandoned, which is a continuation
(Continued)

(51) Int. Cl.
*A01G 24/42* (2018.01)
*A01G 24/35* (2018.01)
*B01J 20/26* (2006.01)

(52) U.S. Cl.
CPC .............. *A01G 24/42* (2018.02); *A01G 24/35* (2018.02); *B01J 20/26* (2013.01)

(58) Field of Classification Search
CPC .......... A01G 22/00; A01G 24/00; B01J 20/26
See application file for complete search history.

(56) References Cited

U.S. PATENT DOCUMENTS 3,336,979 A  8/1967  Ingraham et al.
3,973,355 A  8/1976  McKenzie
(Continued)

FOREIGN PATENT DOCUMENTS

WO  WO8501736  4/1985
WO  WO2009102565  8/2009

OTHER PUBLICATIONS

Drill & Fill Manufacturing. Turf Tractor Specifications. http://www.drillandfillmfg.com/tractor.html. Accessed May 27, 2008.
Drill & Fill Manufacturing. DF24—Drill & Fill Aerator Head Specifications. http://www.drillandfillmfg.com/drillfill.html. Accessed May 27, 2008.
(Continued)

*Primary Examiner* — Jennifer A Smith
(74) *Attorney, Agent, or Firm* — Pate Baird, PLLC

(57) ABSTRACT

A composite, time-delayed, polymer-coated, granulated material for maintaining hydration in plants is formulated to delay acceptance of water in order to operate in drilling, plugging, and disking equipment used for aeration, soil amendment, or both. Whether potted or outdoors, whether relying on a third-material binder or a small, hydrated portion of the polymer itself as a binder, the material may be injected or otherwise placed below the surface of soils. Water is eventually absorbed sufficiently to expose the bulk of the hydrating particles attached to each granule. Addition of the granulated material as a soil amendment resists dehydration normally occurring in plants between waterings, yet its initial delay in hydrating supports water-jet injection and soil integration by resisting premature expansion from hydration.

20 Claims, 4 Drawing Sheets

Related U.S. Application Data of application No. 13/484,482, filed on May 31, 2012, now Pat. No. 8,739,464, which is a continuation of application No. 12/565,452, filed on Sep. 23, 2009, now Pat. No. 8,196,346.

(60) Provisional application No. 61/099,852, filed on Sep. 24, 2008.

(56) References Cited

U.S. PATENT DOCUMENTS

| | | |
|---|---|---|
| 4,579,587 A | 4/1986 | Cooke |
| 7,244,492 B2 | 7/2007 | Sinclair et al. |
| 2005/0005869 A1 | 1/2005 | Fritter et al. |
| 2006/0078682 A1 | 4/2006 | McDaniel et al. |
| 2006/0255490 A1 | 11/2006 | Gaytan |
| 2008/0230223 A1 | 9/2008 | McCrary et al. |
| 2010/0112200 A1 | 5/2010 | Barthel et al. |

OTHER PUBLICATIONS

Drill & Fill Manufacturing. D60—Drill Aerator Head Specifications. http://www.drillandfillmfg.com/drill.html. Accessed May 27, 2008.

Drill & Fill Manufacturing. Drill & Fill Aerification. http://www.drillandfillmfg.com/options.html. Accessed May 27, 2008.

Hogentogler & Co., Inc. Sieves: ASTM E-11 / AASHTO T-27. M-92. http://www.hogentogler.com/sieves/200mm_metric_sieves.htm. Accessed Dec. 11, 2007.

Graden USA, Inc. CSI Contour Sand Injection Specifications. http://www.gradenusa.com/_Sand_Injection.php. Accessed May 27, 2008.

Silica Fume Association. "What is Silica Fume?" http://www.silicafume.org/general-silicafume.html. Accessed May 27, 2008.

AZ Materials. Silica—Fumed Silica (Silicon Dioxide). http://www.azom.com/details.asp?ArticleID=1386. Accessed May 27, 2008.

DryJect: Soil Amendments. http://www.dryject.com/dryject/profile.cfm. Accessed May 27, 2008.

DryJect: How it Works. http://www.dryject.com/dryject/howitworks/index.cfm. Accessed May 27, 2008.

DELAYED-ACTIVATION, HYDRATION MAINTENANCE APPARATUS AND METHOD

RELATED APPLICATIONS

This application: is a continuation of U.S. patent application Ser. No. 14/293,555, filed Jun. 2, 2014, which is a continuation of U.S. patent application Ser. No. 13/484,482, filed May 21, 2012, now U.S. Pat. No. 8,739,464, issued Jun. 3, 2014; which is a continuation of U.S. patent application Ser. No. 12/565,452, filed Sep. 23, 2009, now U.S. Pat. No. 8,196,346, issued Jun. 12, 2012; which claims the benefit of U.S. Provisional Patent Application Ser. No. 61/099,852, filed Sep. 24, 2008; all of which are hereby incorporated by reference.

BACKGROUND

The Field of the Invention

This invention relates to horticulture and, more particularly, to novel systems and methods for amending soils to maintain hydration of plants, aeration of soils, or both.

The Background Art

Different types of soils perform their functions differently. In particular, rocky soils, sandy soils and the like tend to pass water too freely. Likewise clay soils tend to hold water, but yet not permit the water to distribute therethroughout. Typically, organic soils, having substantial amounts of loam formed by organic matter such as leaves, other foliage, decaying plant matter, and the like, provide better absorption and holding of water.

The health of plants depends upon access to water. Many parts of the United States, and even indoor plant locations such as malls, homes, offices, and the like receive little or no rainfall. Irrigation or periodic watering by some mechanism is often required. In such situations, plants may dwell for an extended period without additional water. Organic soils improve the water holding capacity around such plants. Nevertheless, evaporation and periodic watering may still combine to stress plants.

Meanwhile, aeration is not without its problems. Drills and coring devices leave on the surface of the soil the material removed from penetrations made for aeration. For a golfing green or the like, such deposits disturb the playing surface. Even on a lawn, such deposits may be unsightly or otherwise problematic.

It would be an advance in the art to provide a material, apparatus, and method whereby to automatically store within a soil, such as near roots, a substance to absorb water, releasing it over time while resisting evaporation. It would be a further advance in the art to create materials and methods for soil amendment, so materials could be automatically injected into soils to provide aeration and maintenance of hydration by an aeration or tillage device. It would be a further advance in the art to provide an apparatus, method, and material by which to amend soils for improved hydration and aeration without hampering operation of tillage and dressing equipment.

It would be a further advance in the art to provide apparatus, methods, and materials to delay activity of a soil amendment until the amending material has had time to be received and integrated more deeply into the soil and the soil has had time to redistribute or recover from the disturbance caused by placement of the hydrating amendment into the soil through dressing or tillage.

BRIEF SUMMARY OF THE INVENTION

In view of the foregoing, in accordance with the invention as embodied and broadly described herein, a composition, method, and apparatus are disclosed in various embodiments in accordance with the present invention to include a substrate or carrier. The carrier may be sand, rock, vermiculite, another inorganic material, or an organic material, such as seed, for example. The carrier may have secured thereto, temporarily or permanently, an absorbent, typically a hydrating polymer such as polyacrylamide (PAM). A repellant may coat the carrier, providing a shield for rejecting liquid water for some preselected period of delay.

Eventually, the repellant is breached, and water can then be absorbed by the absorbent in proximity to the substrate (e.g. carrier particle). In certain embodiments, such as where a potted plant may have a transparent vessel or pot in which it is held, pigment may be added to the polymer, to an optional binder or solvent, or to the surface of the substrate (carrier) by any suitable mechanism. Thus, for example, the hydration maintenance material (absorber) may be configured as an identifying element on its own or as a decorative element for the hydrator material when used with a potted plant or otherwise made visible in use.

The composite, time-delayed, polymer-coated, granulated material for maintaining hydration in plants is formulated to delay acceptance of water. For example, the method and material will resist hydration from humidity or even from water flows in machinery or in soils and the like. The granules will act as a dry material in order to discharge from drilling, plugging, and disking equipment used for aeration, soil amendment, or both. Likewise the method and material may resist hydration for minutes, days, or even weeks after injection into the soil in some embodiments.

Whether potted or outdoors, whether relying on a third-material binder or a small, hydrated portion of the polymer itself as a binder, the hydrator material may be injected or otherwise placed below the surface of soils. Water is eventually absorbed sufficiently to expose the bulk of the hydrating particles attached to each granule. Addition of the granulated material as a soil amendment resists dehydration normally occurring in plants between waterings, yet its initial delay in hydrating supports water jet injection, soil integration, and self-repair of soil penetrations by resisting premature expansion from early hydration.

In certain embodiments, a method for treating soils may provide a hydrator, comprising a carrier formed as granules, an absorber disposed on a surface of the carrier, and a repellant applied to the absorber to resist absorption of water thereby for a preselected period of time. One may select a soil location, provide a cavity in the soil, and deposit or otherwise position a quantity of the hydrator in the cavity. Applying water to the soil location during the preselected period may then integrate the hydrator into the soil. This also provides motivation and time for the surrounding soil to close the cavity to resist escape of the hydrator upon eventual absorption of water by the absorber.

Penetrating the repellant is typically done by water vapor. Once sufficient time and water vapor have passed, the water in the absorber may swell, rupturing the surfaces of the absorber or absorbent and exposing large areas that are not coated with repellant. This will substantially destroy the ability of the repellant to resist absorption of water by the absorber.

Providing water to the soil subsequent to the preselected period may then hydrate the absorber. Maintenance of a portion of the water may be accomplished for a comparatively long time by the absorber, well after drying of surrounding soil proximate the soil location. The absorber is typically a polymer. Various polymers act somewhat like gelatinous substances and will function properly. One synthetic polymer found to work well is polyacrylamide.

The method may optionally include forming the cavity by a device such as a mechanical drill, a water jet drill, a corer, a trencher, a disk, or the like. The carrier may include, be formulated as, or be supplied as particles. The absorber typically may be a powder by comparison, particles an order of magnitude smaller than the carrier particles and initially secured thereto by either a binder or by absorbing water sufficiently to make the absorber tacky enough to attach to the carrier.

The repellant may be added to delay the time (e.g. preselected time) during which the treated granules will delay contact and absorption of liquid water by the absorber. In certain embodiments, the surface tension of liquid water in contact with the repellant effects a surface tension to repel the liquid water from the repellant and any material the repellant is applied to. The repellant is typically an inorganic material. One material that serves as a repellant is silicon dioxide, particularly an amorphous silicon dioxide like fumed silica.

The carrier may include one or more materials selected from the group consisting of seed, insecticide, fungicide, surfactant, fertilizer, organic amendment to soils, root stimulant, and inorganic amendment to soils. The inorganic amendment may be, for example, materials such as sand, gravel, vermiculite, perlite, and so forth.

Binding the absorber to the carrier may be effectively accomplished by partially hydrating the absorber to make it tacky, in order to adhere to the carrier. This has been accomplished by providing water to wet the outside surface of the carrier in an amount of from about one half percent to about twelve percent by weight with respect to the carrier. A range most suitable seems to be from about one half percent to about six percent by weight of water. Best results seem to occur when the amount of water is from about two percent to about three percent by weight. Thus a target of about 2½% is a suitable process design target.

The amount of absorber disposed on the carrier may be from about one half percent to about 50 percent by weight with respect to the carrier. The absorber with no carrier may be used. However, a carrier provides better handling. Also a carrier provides dilution of the more expensive absorber for improved distribution. More desirable results appear to be achieved when the amount of absorber is from about two to about eight percent by weight with respect to the carrier. A target of about six percent has served well in experiments.

The amount of repellant applied may range from about two hundred fifty parts per million by weight to about ten percent by weight with respect to the combined weight of the carrier and absorber. In embodiments contemplated for many commercial purposes, the amount of repellant may typically range from about one tenth percent to about one percent by weight with respect to the combined weight of the carrier and absorber.

In certain embodiments of an apparatus, composition, and method in accordance with the invention amendment may include providing a hydrator made up of a carrier formed as granules, an absorber disposed on a surface of the carrier, and a repellant applied to the absorber to resist absorption of water by the hydrator for a preselected period of time. A tool effective to penetrate a soil location may form a cavity in the soil. For example, a disk, drill, cultivator shoe, punch, perforator, water jet, or the like may act as the tool. Thereafter, a user or the tool may position a charge of the hydrator (with or without other materials or excipients) in the cavity.

Initially, typically for some pre-selected time, the repellant may resist absorption of a liquid such as water by the absorber. The time may range from second to weeks, depending on the amount and disposition of the repellant.

Eventually, the repellant will be breached, typically by some small amount of vapor of the liquid (e.g. water). As the absorber absorbs the vapor and effectively "binds" it, the absorber eventually becomes increasingly hydrated. Absorption eventually results, in turn, in swelling by the absorber in response to the volume of absorption of the vapor phase of the liquid. Finally, the swelling continues until breaching of the repellant layer by the absorber.

Although the repellant may be effective even when gaps exist in coverage on the surface of the absorbers, the repellant cannot re-distribute or otherwise repel liquid forever. For example, surface tension may keep a water droplet at bay. However, eventually some swollen granules of absorbent will extend beyond the envelope defined by the perimeter of the granule of carrier. Such a portion of the absorber is then in a position to directly contact a liquid droplet and absorb it.

The process of absorption may progress exponentially, with more granules creating more breaches in the envelope defined by the layer of repellant. As absorbent granules begin absorbing water vapor, they begin expanding, eventually providing an increasing number of extensions of expanded absorber material reaching outside the perimeter (i.e., envelope) of the coated carrier. The enlarged absorber granules may even begin dominating or defining the perimeter themselves. At some point, absorption may become so pervasive as to be limited only by factors such as the availability of liquid, the rate of transport processes into the absorber, and the maximum amount of liquid that can be absorbed.

In certain embodiments of methods of soil amendment, a hydrator comprising a granulated carrier, coated with a powdered or otherwise formed absorber on a surface thereof, with a repellant applied to resist absorption of water may effectively reduce or substantially resist hydration for a preselected period of time. Thus, selection of a soil location, forming a cavity at the soil location, and injecting a preselected amount of the hydrator will not be interrupted by premature absorption of water.

For example, if perforation of soils and injecting of the hydrator is accomplished by a water jet, premature wetting of, and swelling by, the hydrator may foul machinery and halt operation. Likewise, following injection, premature wetting and swelling of the hydrator may cause the hydrator to extrude out of the cavity, diminishing effectiveness and fouling the surrounding ground with a slippery gel.

By compounding the hydrator to provide a preselected delay, activation of the hydrator to perform its function is delayed. This delay provides time for the hydrator to clear the injection machinery rather than plugging conduits and ports. Likewise, the ground surrounding a cavity or other penetration containing the hydrator has time to respond to ongoing environmental stimuli such as watering, weather, settling, walking thereon, and so forth, tending to close the top opening of the cavity and distribute the hydrator into available spaces in soil surrounding the cavity in or near a root region of a plant.

Plants susceptible to infrequent watering may thus benefit from the water-retention capacity of an absorber, such as a polyacrylamide polymer, a hydrophilic material selected to absorb water in an amount greater than the weight thereof. The polymer, spread as a thin layer or, better yet, comminuted to powder-sized particles, typically an order of magnitude smaller than the granules, will form a gel when exposed to water. However, suitable application of a repellant has been found to control delay of hydration.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

Figure 1:
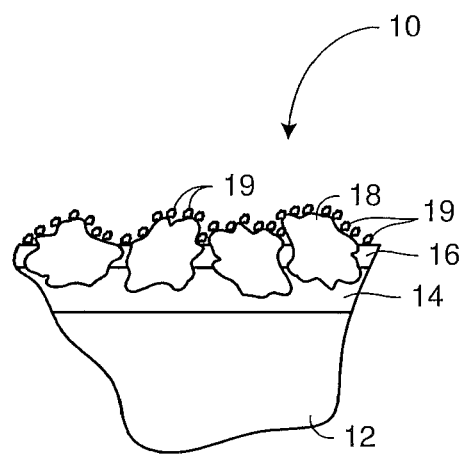
FIG. 1 is a schematic cross-sectional view of a hydrator including a substrate (carrier) provided with a binder selected from either a binding material or simply wetted portions of the absorber (e.g., hydrophilic absorber) attached thereto and coated with an optional repellant to delay activation of hydration in accordance with the invention.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

In general, soil may be improved on a large or small scale by addition of organic matter such as peat moss. Likewise, soils may be made more serviceable by tillage. On a large scale, soils are typically improved by growing and then plowing in (turning under) certain residue of crops, or even manure crops, plants selected and grown exclusively for their addition of organic matter. Likewise, waste materials from corrals, grain stalks (straw), and the like may be plowed into tracts of land in order to improve their organic content and their capacity to hold water for use by plants.

In many environments aeration may be required by the constitution of the soil, or due to an inability to till the soil. For example, a farm field may rely on ripping (sub-soiling), plowing (turning), disking (breaking up), harrowing (leveling), hilling, rowing, cultivating, or any or all of those tillage operations over the course of an agricultural year. By contrast, a lawn or golf green will see virtually no surface tillage on such a large and general scale. Meanwhile, various activities like walking or driving over such ground may lead to compaction of the soils. Thus, aeration devices may penetrate soils to break them up and provide them access to air for "aeration."

Gelatin is a naturally occurring polymer. Gelatin binds with water to form a "gel." The existence of naturally occurring polymers such as gelatin has been augmented by the development of synthetic polymers. One such polymer is polyacrylamide. Polyacrylamide (PAM) and other similar gels have been used for different types of binding processes. For example, a gel, when wet, may be easily formed, and when dry may become something of a glue or binder. Likewise, gels typically are formed of long polymer chains and thus are often durable in the face of erosive actions such as water running over them. Accordingly, gels such as PAM may serve as a treatment for surfaces of ground in order to minimize erosion by the passing of water thereover.

Horticulture is the culture of plants. Plants rely on water as a transport mechanism in order to draw nutrients from the ground into the plants through the roots and into the stems, leaves, and so forth. Likewise, water acts as a transpiration cooling mechanism by evaporation out through the leaves and other foliage of a plant. However, watering in many environments is problematic. Too much watering may result in shallow roots. Meanwhile, too little watering may place undue stress on plants. In some locations, water is usually plentiful, so irrigation systems are not installed. Nevertheless, bouts of periodic drought or low rainfall need to be evened out. In locations where irrigation is used, soils may still have water retention limitations requiring excess irrigation due to water seeping away in porous soils or running off the surface of comparatively impervious soils. A soil amendment in accordance with the invention may assist in retaining water between rainfall or irrigation sessions to reduce stress on plants.

Referring to FIG. 1, a material 10 in accordance with the invention may include a substrate 12, also called a carrier 12, formed of a suitable material for placement in the vicinity of a root system of a plant. For example, a substrate may be a particle of sand. In certain embodiments, even gravel, rock, vermiculite, pearlite, or the like in a potting environment may operate as a substrate.

In some embodiments, a substrate may be formed of either organic or inorganic material. For example wood chips, sawdust, compost, and the like may be comminuted, sorted, or both to provide particles for use as a substrate (carrier) in a material, process, and apparatus in accordance with the invention.

Nevertheless, it has been found very effective to use sand as a substrate 12 inasmuch as it is submersible in water and will not float as many organic materials will when dry. Likewise, the sand as substrate 12 may be quarried, sorted, or purchased at any suitable degree of comminuted size. Small sized spaces or interstices between individual grains of the sand substrate 12 provide ample space and minimum distance for water to surround each of the substrate 12 particles.

In the illustrated embodiment, a substrate 12 may be secured to an absorber 18 by a binder 14 formed of a third material or simply a hydrated region of the absorber rendered tacky (e.g., adhesive) by slight, impartial wetting. The binder 14, the absorber 18, either, both, or neither, may be distributed as a comparatively thin layer on the surface of the substrate 12. Typical materials for binders may include wetted regions of particles of an absorber 18.

Binders 14 may be selected from both temporary and permanent binders 14. Temporary binders may be sugar-based or otherwise water soluble materials. For example, corn syrup, molasses, and the like may form temporary binders. In the presence of water, such material may ultimately dissolve. Nevertheless, so long as the substrate 12 is not turned, mixed, or otherwise disturbed significantly, any other materials supported by the binder 14 would not be expected to dislocate.

Otherwise, certain naturally or synthetically occurring polymers may also be used as a binder 14. Lignicite may be used as a binder 14. Lignicite is a byproduct of wood and provides material having good adhesive properties, and substantial permanence as a binder 14 on a substrate 12.

Other polymers may be used to form a binder 14. For example, various materials used as glues, including mucilage, gelatin, other water soluble polymers including, for example, Elmer's glue, and the like may also operate as binders 14 to bind materials to a substrate 12.

In certain embodiments, water, or perhaps more correctly a dampened portion of the hydrating polymer itself with water, may be the binder. For example, it has been found that dampening the carrier 12 with water in a proportion of from about one quarter to about 10 percent water by weight will effect adhesion of absorbent 18. However, below about ½ percent, adhesion is not as universal as typically desired. Even though adhesion is not required, adhesion of the absorber 18 to the carrier 12 aids the even distribution of the absorber. Otherwise, some degree of segregation of absorber and carrier may occur.

Also, above about 6 percent water by weight dampening the carrier 12, the handling of the mixture of a carrier 12 and absorbent 18 becomes more difficult. The gel becomes slippery, and adhesion of carrier 12 particles together becomes more common and problematic.

The absorber 18 may be added as a film layer on the carrier, but is easily added as a powder (e.g., comparatively smaller particles than the granules of the carrier 12) at a proportion of from about 1 percent to about 20 percent by weight, but typically between about 4 percent and 10 percent by weight. A suitable design point is a proportion of from about 6 to about 7 percent by weight In certain embodiments, the substrate 12 may be used in soils in outdoor environments. In other situations, the substrate 12 may be implemented in indoor pots and planters. In other embodiments, the substrate 12 may be used as a filler material in planters or pots having transparent or translucent walls. In such embodiments, a pigment 16 may be added. Likewise, even if the substrate 12 and its contents bound thereto are not to be seen, they may be pigmented with an appropriate pigment 16 simply for the purpose of identification during selection, sale, or installation. Accordingly, a pigment 16 may be provided.

The pigment 16 may be implemented in any of several manners. For example, the substrate 12 may have pigment 16 applied prior to the application of either the absorber 18 or any form of optional binder 14. In alternative embodiments, the pigment 16 may actually be included in the binder 14, which becomes a pigmented coating on the substrate 12.

In yet other embodiments, the pigments 16 may be added to an absorber 18 (e.g., hydration particle 18) either as a pigment 16 mixed therein, or as a pigment 16 applied as a coating thereto. Pigment may be added to water used to bind the absorber 18 to the substrate 12. Thus the location of the pigment 16 in the Figures is schematic and may be applied in any alternative location or application method, or be eliminated. Likewise for any binding material 14.

Particles 18 of an absorber 18 (e.g., hydrophilic material) may be bonded to the substrate 12 in any suitable manner. Particles may be sized to substantially coat or periodically coat the substrate 12.

In certain embodiments, the absorber 18 such as a hydrophilic material 18 may be a powdered polymeric material 18 such as polyacrylamide. In other embodiments, the particles 18 may actually be organic material having capillary action to readily absorb and hold water. In one presently contemplated embodiment of an apparatus in accordance with the invention, the particles 18 may be powdered polymeric material in a dehydrated state, and having a capacity to absorb water, typically many times the weight of a particular particle 18.

The substrate 12, in certain embodiments, may be sand. The sand will typically be cleaned and washed to remove dust and organic material that may inhibit the binder 14 from being effective. Likewise, the substrate 12 may be sized of any suitable size. For example, sand particles may range from much less than a millimeter in effective diameter or distance thereacross to approximately two millimeters across. Very coarse sands may have even larger effective diameters. Likewise, in certain embodiments, gravel of various sizes may operate as a substrate 12. However in one presently contemplated embodiment, washed and dried sand such as is used in construction, such as in concrete, has been found to be suitable. Fine sands such as masonry sands tend to be smaller, and also can function suitably in accordance with the invention.

Accordingly, the distance across each particle 18 may be selected to provide an effective coating of powdered particles 18 on the substrate 12. In one presently contemplated embodiment, the effective diameter of the particles 18 may be from about a 30 mesh size to about a 100 mesh size. For example, a sieve system for classifying particles has various mesh sizes. A particle size of about 30 mesh, able to pass through a 30 mesh sieve, (i.e., about 0.6 mm) has been found suitable. Likewise, powdering the particles 18 to a size sufficiently small to pass through a 100 mesh (i.e., about 0.015 mm) sieve is also satisfactory. A mesh size of from about 50 mesh to about 75 mesh is an appropriate material dimension to obtain excellent adhesion of particles 18 with or without a separate material as the binder 14, leaving a suitable size of particle 18 to absorb significant liquid at the surface of the substrate 12.

As a practical matter, about half the volume of a container containing a substrate 12 as particulate matter will be space, interstices between the granules of the substrate 12 (carrier 12). One advantage of using materials such as sand as the substrate 12 is that a coating of the particles 18 may provide a substantial volume of water once the particles 18 are fully saturated. By contrast, where the size of the particles 18 is too many orders of magnitude smaller than the effective diameter or size of the substrate particles 12, less of the space between the substrate particles 12 is effectively used for storing water. Thus, sand as a substrate 12 coated by particles 18 of a hydrophilic material such as a polymer will provide substantial space between the substrate particles 12 to hold water-laden particles 18.

The diameter of the particles 18, or the effective diameter thereof, is typically within about an order of magnitude (e.g., 10×) smaller than the effective diameter of the particles of the substrate 12. This order of magnitude may be changed. For example, the order of magnitude difference less than about 1 order of magnitude (i.e., 10×) may still be effective. Similarly, an order of magnitude difference of 2 (i.e., 100×) may also function.

However, with particles 18 too much smaller than an order of magnitude smaller than the effective diameter of the substrate 12, the interstitial space may not be as effectively used. Likewise, with an effective diameter of particles 18 near or larger than about 1 order of magnitude smaller than the size of the particles of the substrate 12, binding may be less effective and the particles 18 may interfere more with the substrate itself as well as the flow of water through the interstitial spaces needed in order to properly hydrate a material 10.

Figure 2:
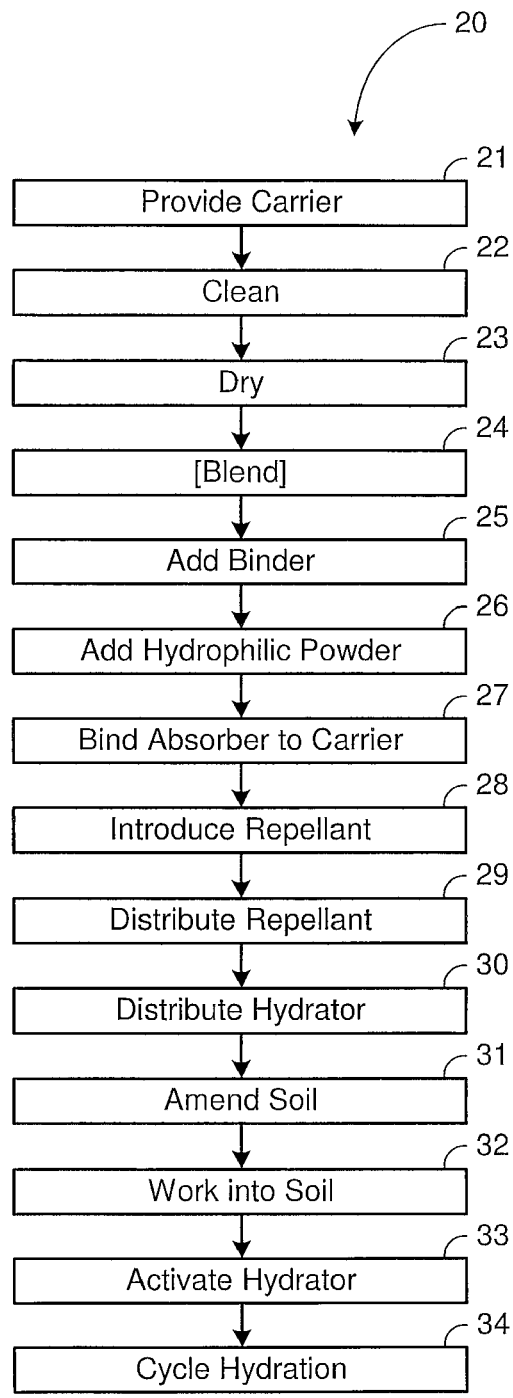
FIG. 2 is a schematic block diagram of one embodiment of a process for formulating and producing a hydrating material (hydrator, soil amendment) in accordance with the invention.

Referring to FIG. 2, an embodiment of a process for formulating the material 10 may involve cleaning 22 the material of the substrate 12. Likewise, the material of the substrate 12 may be dried 23 to make it more effective in receiving a binder 14. The material of the substrate 12 may then be blended 24 with a "binder," whether a separate adhesive material or simply water 14. That is, water as a binder 14 may be added in order to wet the absorber 18 and thus serve as the "binder 14" agent. The portion of the absorber that takes in the small amount of water added may be rendered tacky by hydration, facilitating adhering to the substrate 12.

Blending 24 may begin before addition 25 of a binder 14, and may continue or recur throughout any addition of materials in the process 20. Blending 24 may also begin after addition 25 of a material. The brackets indicate that it is optional, but it has been found effective for more complete and random distribution.

With water, an amount of from about ½ percent to about 10 percent will serve with 2½ percent being a good design point to aim for. However a range of water content should be considered as the response of materials to temperature and relative humidity may vary the most desirable amount of water.

In one embodiment, a ribbon blender may provide an effective mechanism to perform continuous blending as the binder 14 is added 25. Other types of mixers, such as rotary mixers, and the like may be used. However, a ribbon blender provides a blending 24 that is effective to distribute binder 14 as it is added 25.

For example, if an individual particle of the substrate 12 receives too much binder 14 (e.g., adhesive, water, etc.), and thus begins to agglomerate with other particles of the substrate 12, a ribbon blender will tend to separate the particles as a natural consequences of its shearing and drawing action during blending 24.

As the binder 14 is added 25 to the mixture being blended 24, the individual particles of the substrate 12 will be substantially evenly coated. At this stage, the binder 14, particularly if it is a polymer of some type rather than simply water, may also be heated in order to reduce its viscosity and improve blending. Likewise, the material of the substrate 12 or the environment of the blending 24 may be heated in order to improve the evenness of the distribution of the binder 14 on the surfaces of the substrate 12 materials or particles 12.

In one embodiment, using a tacky or adhesive binder, blending 24 is complete when coating is substantially even, and the texture of the material 10 has an ability to clump, yet is easily crumbled and broken into individual particles. At that point, addition 26 of the hydrophilic particles 18 of the absorber 18 may be accomplished.

Adding 26 the particles 18 as a powder into the blending 24 is a stable process. Typically the particles 18 attach 27 or bind 27 at a location of the substrate 12 particles, thus removing from activity that location. Accordingly, other particles 18, rather than agglomerating with one another, continue to tumble in the blending 24 until exposed to a suitable location of binder 14 of the substrate 12. Again, if too much water is used as a binder 14, particles 18 of the absorber may agglomerate. Thus, the adding 26 of the particles 18 or powder 18 of absorber, (i.e., polymer, hydrophilic material, etc.) may be designed without excessive binding capacity, m order to be a self-stable process providing a substantially even coating on all the particles of the substrate 12.

When the substrate 12 and absorber 18 are no longer segregated nor individually distinguishable, and the resulting material 10 pours or flows freely, the mixing works well and is bonded or otherwise mixed and adhered properly. The material 10 formulated by the process 20 may be dusted with particles 18 and will pour freely.

The material 10 is completed by mixing the carrier 12, coated with the absorber 18, to assure a coating thereof by an optional repellant 19, such as fumed silica 19 (alternatively called silica fume and fume silica). Typically, once binding 27 of the absorber 18 to the carrier 12 is completed, the repellent 19 may be introduced 28 to the mix. This introduction 28 may occur immediately upon completion of the binding 27, or may be delayed by hours, even days. Nevertheless, when water is used as the binder 14, it is sometimes beneficial to introduce 28 the repellent 19 right away. For example, additional excessive tumbling and stirring required for introducing 28 the repellent may tend to dislodge some of the absorbent particles 18.

A final coating of hydrophobic silica fume may be introduced 28 and distributed 29 as a repellant 19 to an absorber 18 on a substrate 12 or carrier 12. Distribution 29 of the repellent 19 may be done by any of several methods For example, repellant may be introduced 28 and be distributed 29 as a suspension in alcohol. The liquid mixture may be applied to a surface, distributing the particles of the fumed silica over the surface. Upon evaporation of the alcohol, the particles remain, adhered to the surface.

Introducing 28 the repellent 19 may be done by adding the repellent 19, such as fumed silica 19, as a finely divided powder into the material 10 in its current, that is, then current, condition. For example, in some embodiments, the repellent 19 may be dry and simply added as a powder to then adhere by electrostatic attraction. In other embodiments of the process 20, the repellent 19 may be distributed in alcohol to then be applied. Eventually, the alcohol would be evaporated, leaving the powder well distributed 29.

Upon a thorough distribution 29 of the repellent 19, at a suitable ratio selected to repel liquids for a preselected time, the distribution 20 may be complete. At that point, the repellent 19 should be thoroughly distributed 29, with no significant, residual amount segregated from the main material 10.

The repellant 19 may be added to repel liquids, such as water, for a preselected time in order to aid machine operation during soil amendment, such as by injection. The preselected time may serve as a delay to support settling into the soil before becoming active, to provide time for ground penetrations to close up, thus preventing swelling and extrusion of the material from ground penetrations, and so forth.

Even material 10 intentionally or accidentally spread on top of the ground may settle into turf or soil before absorbing water, thus reducing or eliminating slippery surface conditions after application.

Fumed silica, as an industrial material is formed as a byproduct of silicon metals such as ferrosilicon alloys. For example, certain magnet core iron is a silicon alloy of iron. Silica fumes react with oxygen to form an amorphous silicon dioxide. Other methods of manufacture include a continuous flame hydrolysis technique converting silicon tetrachloride to a gas where it is reacted with water to form the silicon dioxide (silica) and hydrochloric acid.

Fumed silica is a material used as a thickening agent in various liquid formulations in the chemical industry. Fumed silica has a chain-like particle morphology. Thus the particles have an ability to bond by weak hydrogen bonds. As an amorphous material effective to create weak hydrogen bonds in liquids, it forms therewith a thixotropic fluid that flows in response to sufficient shear force. Otherwise, it remains sufficiently viscous to resist flow, even against forces of gravity and surface tension in many liquid coating products.

Figure 3:
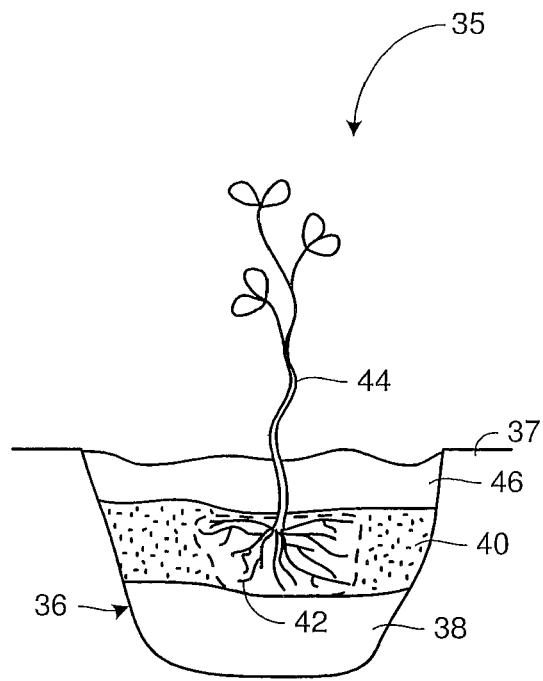
FIG. 3 is a cross-sectional view of one embodiment of one installation of a hydrator formulation in accordance with FIGS. 1 and 2 implemented to service a plant as a hydrating layer.

Particle sizes in accordance with the invention may be less than a micron in effective diameter. Cement particles are about the size to pass through a number 325 mesh sieve. The material size of fumed silica particles is typically about one percent of that of a particle of the cement used to form concrete. In fact, the small size makes this porous, volcanic-ash-like material an excellent constituent in hydraulic cement. Structural concrete of over 15,000 psi compressive strength is possible by inclusion of silica fume in the admixture. Fumed silica, or silica fume is naturally hydrophilic. However, it can be treated with organosilicons to convert the naturally hydrophilic silica to a hydrophobic material.

In practice, it has been found adequately effective to introduced 28 and distribute 29 silica repellant 19 dry. The silica powder 19 is sufficiently dielectric to be distributed 29 by dry mixing with the carrier 12 particles coated with absorber particles 18. Electrostatic charge appears to adhere the repellant to the surface of the material 12, while also spacing individual particles 19 of the repellant 19 at maximum distance from one another. The result is a substantially equidistant distribution 29 of particles 19 over the surface of the material 12, each held to the surface by electrostatic forces.

Distribution 30 of the material 10 may be conducted in a variety of ways and may include one or several processes. For example, distribution may include marketing distribution from packaging after completion of blending 24, shipping to distributers and retailers, and purchase and application by users. An important part of distribution 30 is the deployment of the material 10 around the roots of a plant. In one embodiment of an apparatus and method in accordance with the invention, the material 10 may be poured, as if it were simply sand 12 or other substrate 12 alone. Since the powdered absorber 18 or particles 18 will substantially occupy the binder 14 (whether water or adhesive), the material 10 will not typically bind to itself, but will readily pour just as the initial substrate material 12 will.

The amount of repellant 19 introduced 25 may range from about two hundred fifty parts per million by weight to about ten percent by weight with respect to the combined weight of the carrier 12 and absorber 18. In embodiments contemplated for many commercial purposes, the amount of repellant 19 may typically range from about one tenth percent to about one percent by weight with respect to the combined weight of the material 10 constituting the carrier 12 and absorber 18.

Amending 31 a soil material may be accomplished by any of several methods. For example, in one embodiment, the hydrator material 10 may be added to a body of soil by mixing, layering, placement around the root system, or other method of distribution and stabilization. In several embodiments, the amending 31 may occur by churning the hydrator material 10 into potting soil or ground soils. In other embodiments, amending 31 may involve penetrating soils in order to place the hydrator material 10 below the surface of the soil.

Working 32 the material!0 into a soil may occur by active cultivation, by the passage of time, by watering and thus flowing the material 10 as granules with the water to a place of lower elevation from a place of higher elevation. For example, settling and migration of particulate materials 10 will serve to work 32 the material 10 into the soil.

Time is a significant factor in working 32 materials into the soil. For example, injecting or inserting the material 10 into soils or into a cavity in soils may benefit from waiting some period of time for watering, motion, gravity, and other phenomena to act on the material 10 to migrate it downward and to settle it within the soil.

By whatever mechanism, the material 10 is worked 32 into the soil. Thereafter, activating 33 the hydrator material 10 may be initiated by typically adding liquid, such as irrigation water. Depending upon the preselected time for which the repellent 19 has been selected and applied, initiating activation 33 may precede by a considerable time, from seconds to many days, the actual response of absorption of liquids by the material 10.

For example, at some levels of application of the repellent 19, a material 10 may begin absorbing water within a matter of minutes or even seconds after being exposed to water. Accordingly, a material 10 may be injected into the soil by a water injection jet, by which the material 10 flows quickly down a tube or chute behind a jet of water. Since the tube is itself wet with residual moisture from the water jet, it may absorb water and plug the machine if not properly treated. Accordingly, with the repellent 19 treated material 10, only a matter of seconds are needed in order to alleviate failing of the injection machine.

In other embodiments, it may be desirable to provide time for the material 10 to settle into a cavity in the soil. For example, if soil is opened up by disking, drilling, aerator punching, water jet penetration, or the like, it may be desirable to wait a matter of hours or days for the soil to settle and for any opening at the surface of the soil to close.

For example, hydrating a large body of the hydrator material 10 immediately after insertion into the soil may cause swelling sufficient to extrude the material 10 back out of the cavity 36 into which it is placed. Thus, the activation 33 may occur over time, beginning with initial exposure to moisture, and ending when the absorber 18 is fully active and capable of absorbing maximum water exposed to the material 10.

After the material 10 has been activated 33, then cycling 34 of hydration will occur with each watering cycle. For example, upon exposure to water, the material 10 will absorb water into the absorber 18. Upon a period of extended lack of water, or by absorption of water from the material 10 into the roots of plants, the moisture in the material 10, and more particularly in the absorber 18, will be depleted. The cycling 34 continues upon re-watering of the soil 52 near the plants 44 relying upon the material 10.

Referring to FIG. 3, in one embodiment of an installation 35, distribution 30 may include pouring a layer of the material 10 near a plant. In the illustration of FIG. 3, the process 35 or installation 35 may include forming a cavity 36 in the ground; by any suitable method. Methods for perforating soils may include drilling, aerator punching, disking, jet penetration, or the like. Following perforation, insertion or pouring of the hydration material 10 may be done manually or by machine.

For example, for a container such as a pot, planter, or the like one may assemble the potting soil in layers, including a layer of the hydration material 10. Alternatively, a tool may penetrate the soil near roots and a user may pour the material 10 in the resulting cavity 36. In the illustrated embodiment, the cavity 36 may have a surrounding environment 37 such as the ground. A potting mixture 38 or potting soil 38 may fill a portion of the cavity 36.

A mixture of horticultural soil may include a mixture of peat moss, humus, or compost along with other drainage materials. For example, gravel, sand, vermiculite, pearlite, or the like may be mixed with an organic material such as peat moss or compost in order to provide drainage in addition to the moisture capacity of the organic material.

The material 10 in accordance with the invention may be disposed in a layer 40 poured around a root ball 42 of a plant 44. Accordingly, the layer 40 may provide to the root ball 42, or to individual roots a surrounding environment 40 having both ease of water transport or drainage through the substrate 12 (e.g., sand, etc.) while also having the particles 18 of hydrophilic material 18 to absorb and maintain water within the interstitial spaces between the substrate 12 particles.

In another embodiment, a machine may perforate the soil of a golf course, lawn, farm, or the like by penetrating the soil with a tool or implement of any known type. Thereafter, the hydration material 10 may be poured, driven, washed, swept, jetted, or otherwise introduced into the resulting cavity. In one embodiment, a jet of water may form a cavity penetrating a soil location. A quantity of the material may be positioned by a machine to follow the jet into the cavity formed by the jet.

In another embodiment, a punch (e.g., such as an aerator known in the art or of new design) may core out a cavity 36, removing the soil therein and may then replace the removed soil core with an injection of granulated hydration material 10 in accordance with the invention. In another embodiment, a disk or seed drill (e.g., cultivation tool to open, fill, and close a trench for seed or the like) may open a trench, a conduit may pour the material 10 into the trench, and the disk or drill may either move the soil back to cover the material 10, or simply allow a lifted portion of the soil to drop back into place.

It is not imperative that the substrate 12 or carrier be inorganic. Substrates 12 may be chosen from soil, sand, compost, organic particles, seeds, insecticides, wetting agents, fungicides, fertilizers, root stimulants, or any other soil amendment of organic or inorganic types. Various companies' products may be used as soil amendments under various trademarks, such as Profile™, Nutrimulch™, and Field and Fairway™. Various machines under trademarks such as Dryject™, Graden™, CSI™ and others may be used to introduce soil amendments into soils. A drill may create a hole, a corer may remove a plug of soil, a disk may cut into soil, or a like process may form a cavity 36 to place a soil amendment 10.

For example, in one embodiment, a drill (e.g., like a common drill to make vertical holes) may drill cavities 36 of from about one inch to about 15 inches in length several inches apart, typically 3 inches to a foot apart, and most typically about 5 to 8 inches apart. Penetrations may be made in arrays by a drill or jet array or in lines by a row of drills, jets, or other penetration devices passing over and periodically making cavities 36 in the soil.

However, premature hydration of a material 10 may foul a machine during distribution of the material 10 into the soil. Likewise, premature absorption of water by the material may cause local swelling of the ground therearound or extrusion of the material 10 as it swells. Thus, in one embodiment of a material in accordance with the invention, the type, amount, and disposition of the repellant 19 on the absorber 18, substrate 12, or all such features thereof may be selected to provide a preselected time during which the material 10 may be exposed to liquid without effectively absorbing or swelling sufficiently to be "activated" for regular and complete absorption and retention of water.

For the preselected time, the repellant will act to prevent access by liquid water to the absorbent 18. Over time, it has been found that water vapor can and will pass through the spatial envelope defined by the repellant 19. It appears that a greater quantity of repellant tends to maintain liquids at bay for a greater time. Thus, for example, it has been found that the gross or general absorption of water by an absorber 18 such as polyacrylamide may be delayed from about several seconds to about six days, when used in an amount of from about one twentieth of one percent to about five percent, respectively, by weight of the material 10.

As more and more water vapor passes and begins binding to the absorber 18, the absorber 18 will swell. At some point, the absorber will swell sufficiently to breach and escape the envelope defined by the repellant 19. Projecting out into available liquid water, the absorber 18 will then begin absorbing water up to its physical limit.

Thereafter, the material 10, in a long cylindrical penetration into the ground, in a network of fissures blasted into the ground, in a trench, in a layer 40, or otherwise disposed in a soil or the ground may provide a dynamic reservoir within the cavity 36. The material 10 may be engineered to resist hydration for a predetermined time. Thereafter, it may, by that same engineering design, maintain a high degree of hydration (e.g., water held in a gel) that will not drain into the environment 37, nor be readily evaporated out. To this end, a top dressing 46 or a top layer 46 may be laid down on top of the layer 40 or soil 52 in order to provide some protection against evaporation from heat, sun, air, and the like.

The top layer 46 may be formed of the same potting soil or other material of the layer 38 below the plant 44 and the root ball 42. Various suitable top layers 46 exist and are known in the horticulture arts.

For example, mulches, wood chips, synthetic materials, plastic sealing, and the like may be used as a covering layer 46 Inhibiting heat transfer and excessive access to air and heat may assist in reducing evaporation from the layer 40 of the material 10.

Figure 4:
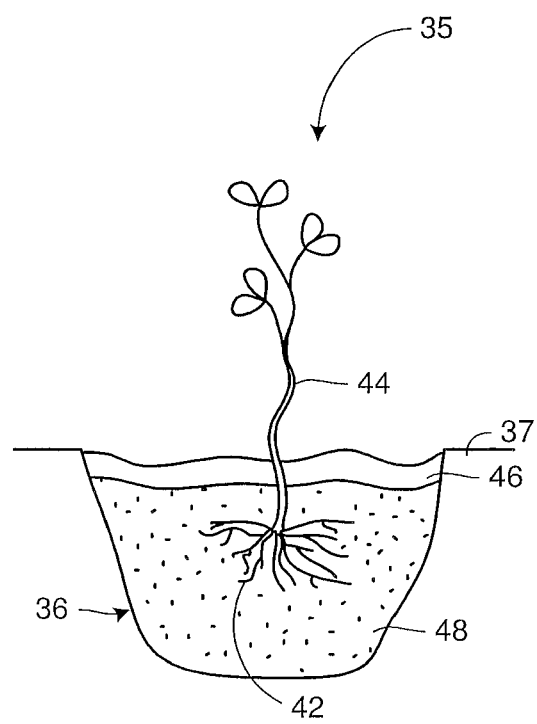
FIG. 4 is an alternative embodiment of an installation in accordance with the invention having the material of FIG. 1 distributed throughout a region surrounding a root system of a plant.

Referring to FIG. 4, an alternative embodiment of an installation 35 may include the cavity 36 and an environment 37 as discussed above. In the embodiment of FIG. 4, the root ball 42 may be surrounded by a distributed mixture 48 or fill 48 that includes the material 10 mixed into another potting soil mixture. For example, in the embodiment of FIG. 4, a potting soil mixture of any suitable combination of materials (e.g., selections from vermiculite, perlite, sand, peat moss, compost, soil, gravel, or the like as recited hereinabove) may be mixed with the material 10 throughout.

A top layer 46 forming a suitable dressing to minimize evaporation from heat or wind may still serve well.

Once applied to soils, the material 10 works 32 its way into the soil by natural settling, watering, and operation of weather and gravity. Also, the particle size, softening of soils with watering, and the swelling and contraction with absorption and release of moisture all act to work the particles 10 into the soil, whether initially injected into the soil or applied as a top dressing.

The material 10 may typically include from about 1 percent to about 20 percent of an absorber 18, also called a hydrophilic material 18 or absorbent particles 18. The particles 18 may be formed of a naturally occurring material, such as a cellulose, gelatin, organic material, or the like.

In one embodiment, a synthetic gel, such as polyacrylamide may be used for the absorber particles 18, in a ratio of from about 1 to about 20 percent particles 18 compared to the weight of the substrate 12. In experiments, a range of from about 5 to about 10 percent by weight has been found to be most effective for the effective amount of absorber particles 18.

Sizes of particles 18 may range from about 20 mesh to smaller than 100 mesh. Particles 18 of from about 50 to about 75 mesh have been found most effective.

The binder 14 may typically be in the range of from about in ¼ percent to about 3 percent of the weight of the substrate 12. A range of from about ¾ percent to about 1½ percent has been found to work best. That is, with a binder such as lignicite, ¼ of 1 percent has been found not to provide as reliable binding of particles 18 to the substrate 12. Meanwhile, a ratio of higher than about 3 percent by weight of binder 14 to the amount of a substrate 12, such as sand, when using lignicite as the binder 14, tends to provide too much agglomeration. The pouring ability of the material 10 is inhibited as well as the blending 24, due to agglomeration. Other binders also operate, including several smaller molecules that are water soluble. For example, glues, gelatins, sugars, molasses, and the like may be used as a binder 14.

Again, water alone may be used as a binder 14 by exposing particles 18 of absorber 18 to a limited amount thereof. For example, mixing from about Yz percent to about 6 percent water by weight, with respect to the substrate 12, one may mix the absorber 18 in, and the absorber 18 will absorb the water and bind to the substrate 12 or carrier 12. A tumbling type of mixing has been found effective. Below ½ percent water, binding will still occur, but has not typically been found to be universal, reliable, nor complete. Likewise, greater than 6 percent water still works to bind the absorber. In any event humidity and temperature effects may affect the mixing and binding processes. However, above about six percent water, the absorber 18 tends to take on too much water, resulting in agglomeration of the carrier particles 12 by the moistened particles 18 of absorbent material 18 therebetween. Within the range of from about ½ percent to about 6 percent water, by weight, mixing works well, adhesion of particles 18 to the substrate 12 works well, and the material 10 still flows freely as a granular material.

One substantial advantage for the material 10 in accordance with the present invention is that the material remains flowable as a particulate or sand-like material 10 into the area of roots and under a rootball or around the individual open roots of plants being transplanted. With the repellant 19 applied thereto, such flowing works well even in the presence or water. For example a water jet creating a cavity in soil can draw a slug or charge of delayed-hydration material 10 into a conduit of a machine for delivery into the cavity formed by a water jet. Properly formulated, the material 10, during the preselected time for which it is designed, remains substantially unaffected by the moisture or humidity in the delivery machine, a delivery conduit, exposure to the jet drawing the charge into the cavity, residual water in the cavity, nor subsequent irrigation of surrounding soils and the cavity. Thus, soil dressing machinery is not fouled, soils do not swell excessively (e.g., operationally perceptibly), and the use of property such as grounds, fairways, and greens is not unduly interrupted.

Handling and application is simple, and the ability of granular material 10 to flow under and around small interstices between roots or between potting materials provides for a very effective application. The material 10 treated with repellant 19 aids in simplifying storage, drilling, delivery, and recovery.

Figure 5:
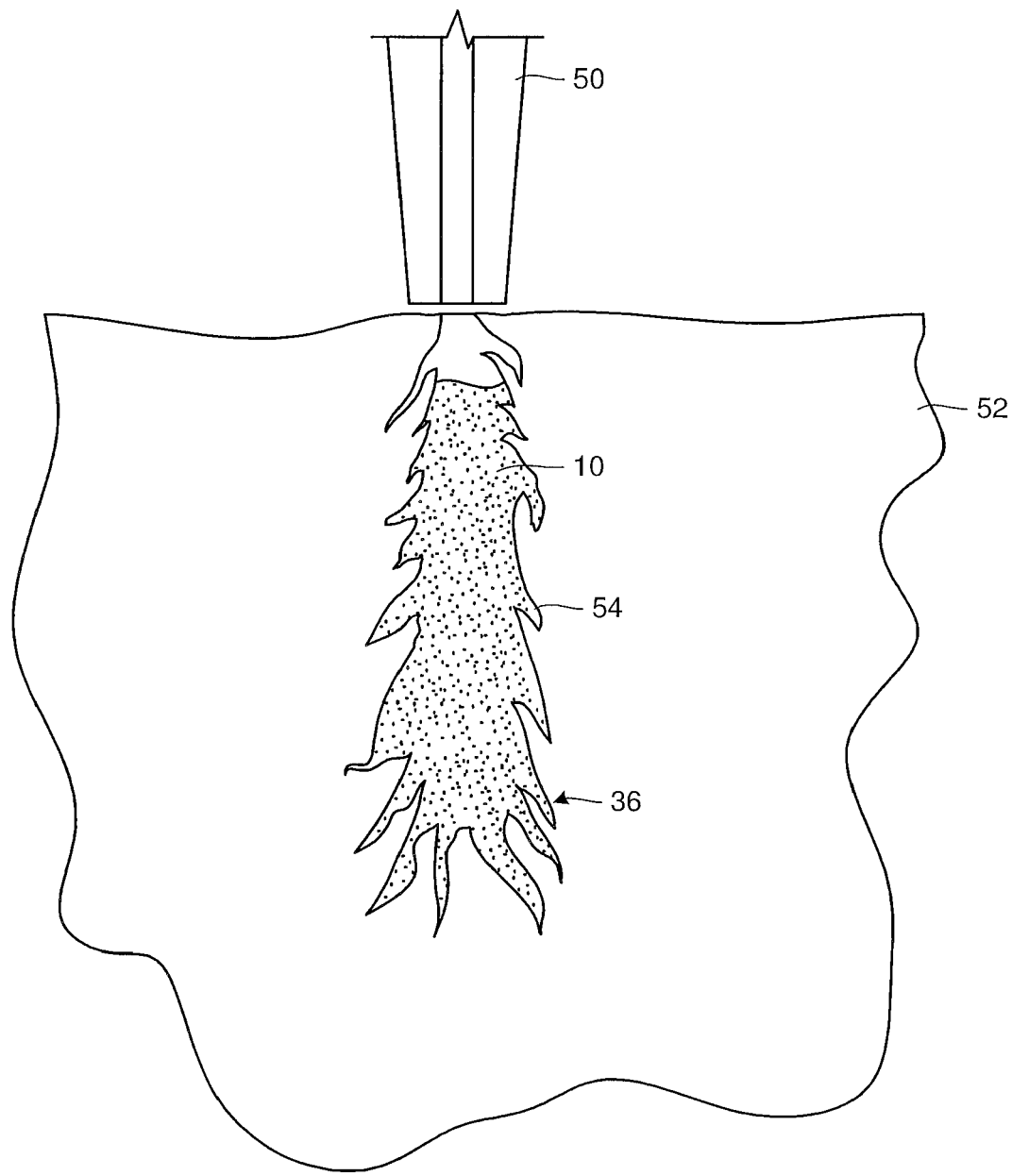
FIG. 5 is a cross-sectional view of one embodiment of an apparatus and method for creating a cavity and filling it with delayed-activation hydrator material of FIG. 1 as a soil amendment, in accordance with the invention.

Referring to FIG. 5, a tool 50, may introduce the material 10 into a soil 52 or plot 52 in soil. In certain embodiments, the tool 50 may be embodied as a corer that will remove soil. In others, the tool 50 may be a drill. In the illustrated embodiment, the tool 50 is a jet conduit 50 that injects a jet of water into the soil 52 forming the cavity 36.

In the illustrated embodiment, following the evacuation or formation of a cavity 36, by the water, a quantity of the material 10 follows the water through the tool 50 and fills up the various portions, both central and extremities 54 of the cavity 36. Ultimately, continued watering may further move material 10 from the center of the cavity 36 into the extremities 54 by operation of gravity, water fluidization, and so forth. Typically, the material 10 will not fill the cavity 36 completely. This provides for the cavity 36 to subsequently close at its opening near the surface of the soil 52. By closure of the opening of the cavity 36, the material 10 experiences a greater restriction to exiting the cavity 36 upon swelling with hydration.

Actually, the process or the cycling 34 of hydration, passing onto a dryer condition, and then being re-hydrated will also tend to work on the cavity 36 and promote distribution of the material 10 and settlement thereof into the lower extremities 54 of the cavity 36.

Certain experiments were conducted using the material 10 in accordance with the present invention with or without repellent 19 in accordance with the principle of the experiment. For example, in one experiment various sizes of planting pots were used ranging in size from one quart to one gallon, two gallons, and five gallons. Various plants were tested including geraniums, hibiscus, and Indian hawthorn.

In one experiment, a five gallon potting container was half filled with a potting soil mixture of conventional type. Approximately one liter of the material 10 was added as a layer on top of the potting soil. Three geraniums plants where then planted in the material 10. The remainder of the pot was filled with a potting soil mixture.

The pot was placed where it could drain and was watered liberally, with the excess water running out of the drainage apertures in the pot. Four such pots were set up, each having three geranium plants. Four additional pots were set up without using material 10 in a layer 40 around the roots of the plants. All plants were planted and all pots were prepared on the same day. The same amount of water was applied to each of the pots.

After 10 days, the untreated plants lacking the material 10 in the extra layer 40 of the material 10 to hold the water appeared to be extremely stressed. In fact, the plants stressed sufficiently that after 15 days they appeared dead.

Plants potted in the layer 40 of the hydrated material 10 still appeared healthy after 10 days and after 15 days. At 35 days after watering, the plants in the treated pots containing the layer 40 of hydrating material 10 began to appear stressed. Upon watering, they responded well and returned to full hydration and health. The plants in the untreated pots did not recover.

Another test used hibiscus plants with four pots treated with the layer 40 of a hydrating material 10 and four pots untreated. All pots were the same size. The watering process was the same. Thus, as with the geranium experiment, all pots were watered equally.

After 15 days the hibiscus plants that had not been treated with the extra layer 40 of the hydrating material 10 appeared very stressed. After 20 days, the plants in the untreated plots were turning brown.

In contrast, hibiscus plants in the treated pots having an extra layer 40 of hydrating material 10 appeared healthy after 15 days and even out to 22 days, when the hibiscus plants in the untreated plots were in the browning stages of dying.

After 38 days, the hibiscus plants in the treated pots began to show stress. Water was provided to plants at 38 days. The untreated pots were watered the same as the treated pots. Plants in the untreated pots did not respond. The plants in the treated pots responded well and continued living healthily upon the watering at 38 days.

In one experiment, an Indian hawthorn was planted in the ground. About a liter of the material 10 was laid about the roots in a layer 40 as described hereinabove. In this instance, the experiment was conducted in an environment of natural ground. The Indian hawthorn plants were placed in holes approximately 18 inches across by about 15 inches deep. In each instance, the hole 36 prepared for the plant was partially filled with a soil and wetted. Two plants were placed in holes treated with approximately 1 liter of the material 10, each. A control was created by planting two additional Indian hawthorns using each step the same, in preparation of the hole, placement of the soil in the hole, and watering of the soil and the plants. In the control, none of the material 10 was used.

No further water was applied. After 20 days, the untreated shrubs appeared to be dry with some stress. After 33 days, the plants in the untreated holes were dead. Meanwhile, the treated shrubs remained healthy throughout.

In another experiment, the foregoing experiment was repeated using two additional Indian hawthorn plants and treating the soil with a layer 40 containing about 1½ liters of the hydrating materials 10 near the roots. In that experiment, after 20 days, the shrubs appeared healthy. At 33 days, the shrubs began to show a minimal amount of stress. At 40 days, the stressed plants were watered and responded well, returning to health and continued life.

In all of the foregoing experiment series, the particles 18 were of polyacrylamide, and the substrate 12 was sand. The polyacrylamide constituted approximately 5 percent by weight of the overall material 10. The particle size 18 was approximately a 60 mesh granularity.

In certain experiments, the material 10 was formulated with only water as a binder 14. A range of ½ A percent to about 6 percent was found effective to maintain reliable performance yet very reliable and simple mixing and handling of the substrate 12 and absorber particles 18 in the ratios discussed hereinabove. Colorant was sometimes added in suitable proportions to the water in order to provide colored material 10. The best performance, without agglomeration of particles of substrate 12 by the absorber, and without leaving unattached particles of absorber in any significant fraction in the mixed material 10 seemed to occur when using water within this range with a good design point being near about 2½ A percent water by weight. Thus from about 1 percent to about 5 percent is recommended, with a very desirable range of from about 2 percent to about 3 percent for best results. However, this may be adjusted for temperature and humidity available in the environment.

Experiments with the repellant 19 ranged from about $\frac{1}{40}$ percent to about 5 percent by weight of the material 10. At a zero percentage control, having no repellant 19, absorption of water occurred immediately upon introduction of the water to the absorber 18. At $\frac{1}{40}$ percent, the effect of delay was perceptible but almost unnoticeable. At about $\frac{1}{20}$ percent, the preselected time for delay of gross absorption of water by the material 10 was about five minutes. At $\frac{1}{10}$ percent, delay was typically from about 40 seconds to a minute before large scale absorption by the absorber material 18. At 5 percent repellant 19 by weight, the delay time for activation of the material 10 was six days to observe even a minimal absorption of water by the material 10. Experiments with repellant 19 in a proportion of from about $\frac{1}{10}$ percent to about 1 percent provided suitable delays for avoiding fouling machines and permitting soils to return to normal without premature swelling that may cause undue swelling, extrusion from soil cavities, slippery consistency, and so forth.

Experiments conducted on seeds as a substrate 12 resulted in germination of the seeds by surrounding water vapor while the exterior of the seeds remained dry throughout the experiment.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A method for treating soils, the method comprising:
providing a hydrator, comprising a carrier formed as granules, an absorber disposed on a surface of the carrier, and a repellant applied to the absorber to resist absorption of water thereby;
selecting a soil location;
providing a cavity in the soil;
positioning a quantity of the hydrator in the cavity;
applying water to the soil location to integrate the hydrator into the soil and to close the cavity to resist escape of the hydrator upon eventual absorption of water by the absorber;
penetrating by water the absorber to substantially destroy the ability of the repellant to resist absorption of water by the absorber;
providing water to the soil to hydrate the absorber; and
maintenance of a portion of the water by the absorber after drying of surrounding soil proximate the soil location.

2. The method of claim 1, further comprising forming the cavity by a device selected from the group comprising a drill, a corer, a trencher, a disk, and a jet of fluid.

3. The method of claim 1, wherein the carrier comprises first particles and the absorber comprises second particles an order of magnitude smaller than the first particles and initially secured thereto for absorbing water.

4. The method of claim 1, wherein the repellant comprises a material having a surface tension effective to repel liquid water.

5. The method of claim 1, wherein the repellant is an inorganic material.

6. The method of claim 1, wherein the repellant is fumed silica.

7. The method of claim 1, wherein the carrier includes one or more materials selected from the group consisting of seed, insecticide, fungicide, surfactant, fertilizer, organic amendment to soils, root stimulant, and inorganic amendment to soils.

8. The method of claim 7 wherein the inorganic amendment to soils is selected from the group consisting essentially of sand, gravel, vermiculite and perlite.

9. The method of claim 1 wherein the absorber is a polymer.

10. The method of claim 9, wherein the polymer is polyacrylamide.

11. The method of claim 1, further comprising binding the absorber to the carrier by partially hydrating the absorber to form a binder portion thereof effective to adhere to the carrier.

12. The method of claim 11, further comprising providing water to wet the outside surface of the carrier in an amount of form about one half percent to about twelve percent by weight with respect to the carrier.

13. The method of claim 1, wherein the amount of absorber is from about one half percent to about 50 percent by weight with respect to the carrier.

14. The method of claim 1, wherein the amount of repellant is from about two hundred fifty parts per million by weight to about ten percent by weight with respect to the combined weight of the carrier and absorber.

15. A method of soil amendment, the method comprising:
providing a hydrator, comprising a carrier formed as granules, an absorber disposed on a surface of the carrier, and a repellant applied to the absorber to resist absorption of water thereby;
providing a tool effective to penetrate a soil location;
forming a cavity by the tool;
positioning a charge comprising the hydrator in the cavity;
resisting, by the repellant, absorption of a liquid by the absorber;
passing a vapor of the liquid through the repellant to hydrate the absorber;
swelling of the absorber in response to absorption thereby of the vapor; and
breaching by the absorber, the repellant to provide access to the absorber by the liquid.

16. A method of soil amendment, the method comprising:
providing a hydrator, comprising a carrier, an absorber disposed on a surface of the carrier, and a repellant applied to the absorber to resist absorption of water thereby for a preselected period of time;
selecting a soil location;
forming a cavity at the soil location;
injecting a preselected amount of the hydrator;
waiting the preselected period of time as the hydrator works into the cavity and the cavity closes sufficiently to resist exit of the hydrator from the cavity due to absorption;
substantially neutralizing the effect of the absorber to expose the hydrator to liquid water; and
utilizing the hydrator to store a quantity of water effective to support hydration of a plant located proximate the soil location.

17. The method of claim 16, wherein the absorber is a polymer selected to absorb liquid water.

18. The method of claim 17, wherein the carrier is an inorganic material.

19. The method of claim 16, wherein the carrier is comprises first particles and the absorber comprises second particles an order of magnitude smaller than the first particles and initially secured thereto for absorbing water.

20. The method of claim 17, wherein the polymer is polyacrylamide.

* * * * *